US005115982A

United States Patent [19]

Mesenich

[11] Patent Number: 5,115,982

[45] Date of Patent: May 26, 1992

[54] ELECTROMAGNETIC FUEL INJECTOR WITH TILT ARMATURE

[75] Inventor: Gerhard Mesenich, Bochum, Fed. Rep. of Germany

[73] Assignee: Siemens Automotive L.P., Auburn Hills, Mich.

[21] Appl. No.: 419,490

[22] Filed: Oct. 10, 1989

[30] Foreign Application Priority Data

Oct. 10, 1988 [DE] Fed. Rep. of Germany ....... 3834445

[51] Int. Cl.[5] .......... F16K 31/06

[52] U.S. Cl. .......... 239/585.3

[58] Field of Search .......... 251/129.66; 239/596, 239/585, 533.12

[56] References Cited

U.S. PATENT DOCUMENTS

| | | | |
|---|---|---|---|
| 2,321,853 | 6/1943 | Ray | 251/129.16 |
| 3,235,223 | 2/1966 | Wintriss | 251/129.16 |
| 3,432,106 | 3/1969 | Townsley et al. | 239/585 |
| 3,544,936 | 12/1970 | De Forest et al. | 335/245 |
| 3,722,531 | 3/1973 | Verhart | 137/271 |
| 3,751,001 | 8/1973 | Rayment | 251/141 |
| 3,752,602 | 8/1973 | Hansen et al. | 251/129.16 X |
| 3,982,554 | 9/1976 | Saito et al. | 137/82 |
| 4,057,190 | 11/1977 | Kiwoir et al. | 239/533.12 X |
| 4,142,683 | 3/1979 | Casey et al. | 239/585 |
| 4,245,789 | 1/1981 | Gray | 239/585 |
| 4,390,130 | 6/1983 | Linssen et al. | 239/585 |
| 4,572,436 | 2/1986 | Stettner et al. | 251/129.16 X |
| 4,610,425 | 9/1986 | Kelly | 251/129.2 |
| 4,621,660 | 11/1986 | Klocke | 137/625.44 |
| 4,646,974 | 3/1987 | Sofianek et al. | 239/533.12 X |

FOREIGN PATENT DOCUMENTS

| | | |
|---|---|---|
| 0235451 | 9/1987 | European Pat. Off. . |
| 1017288 | 10/1957 | Fed. Rep. of Germany . |
| 1125546 | 3/1962 | Fed. Rep. of Germany . |
| 1247793 | 8/1967 | Fed. Rep. of Germany . |
| 2115004 | 10/1972 | Fed. Rep. of Germany . |
| 3334072 | 11/1985 | Fed. Rep. of Germany . |
| 3619818 | 12/1987 | Fed. Rep. of Germany . |
| 801051 | 9/1958 | United Kingdom . |
| 1226481 | 3/1971 | United Kingdom . |
| 2094942 | 9/1972 | United Kingdom . |
| 1348671 | 3/1974 | United Kingdom . |

OTHER PUBLICATIONS

Vol. 10 No. 146 (M-482); 61-2982 (A); Takashi Hosokawa; Solenoid Valve; Appl. No. 59-123994.

*Primary Examiner*—Andres Kashnikow
*Assistant Examiner*—Kevin P. Weldon
*Attorney, Agent, or Firm*—George L. Boller; Russel C. Wells

[57] ABSTRACT

An electromagnetic valve for fuel injection into the suction pipe of combustion motors. The valve features a tilt-armature of very low mass. The valve is mounted in a plastic housing and can therefore be inexpensively manufactured. The valve can also be adapted to be a three-way valve. In addition, the valve can be equipped with a mono-stable polarized magnetic circuit.

7 Claims, 5 Drawing Sheets

ELECTROMAGNETIC FUEL INJECTOR WITH TILT ARMATURE

FIELD OF THE INVENTION

The subject of the invention is a miniature electromagnetic fuel injector intended for the bulk injection of fuel into the suction pipe of combustion motors. The fuel pressure preferably is in the order of 1–4 bar.

BACKGROUND AND SUMMARY OF THE INVENTION

There exist a large number of electromagnetic injection valves for the purpose of fuel injection into the suction pipe of combustion motors. A common characteristic for these injection valves is a desire for high dosage accuracy. Such high dosage accuracies can be achieved only with very short opening and closing times. Opening and closing times for the best known valves are 0.5–1.5 ms, depending somewhat on the impedance of the electromagnet. The required short closing times should be achieved with the lowest possible input of electrical decreased by armature bounce.

State of the art valves typically are of axially symmetric design. The armature of such valves is located at the central axis of the valve and acts on a valve obturator which in most cases is of needle-type design. Magnetic return flow usually is achieved by means of a metallic housing which includes both the magnet pole and the valve seat. The external diameter of such valves is typically 20–25 mm. The moving mass of the armature is typically from 1–4 g. In order to prevent objectionable armature bounce, and in order to achieve short floating times, the conventional injectors feature only very small stroke heights. The stroke heights of modern injector valves are in the range of 0.05–0.1 mm. In order to prevent unacceptable variations in flow-through characteristics, the state of the art valves require extremely tight machining tolerances. In addition, state of the art valves require a difficult calibration procedure.

It is the objective of this invention to define a very fast fuel injector with low armature bounce and low electric energy consumption requirements.

DESCRIPTION OF THE PREFERRED EMBODIMENT

In contrast to conventional designs, the injector according to this invention features a tilt-armature. The tilt-armature has a very small weight, in general approximately 0.3 g. This low armature mass allows for fast floating movements. The injector consists mostly of plastic material and is therefore especially low in production costs. The injector features extremely small overall dimensions, with the outer diameter in the magnetic circuit region being only about 10–12 mm. Therefore, the injector can be readily adapted to a variety of mounting conditions.

Figure 1:
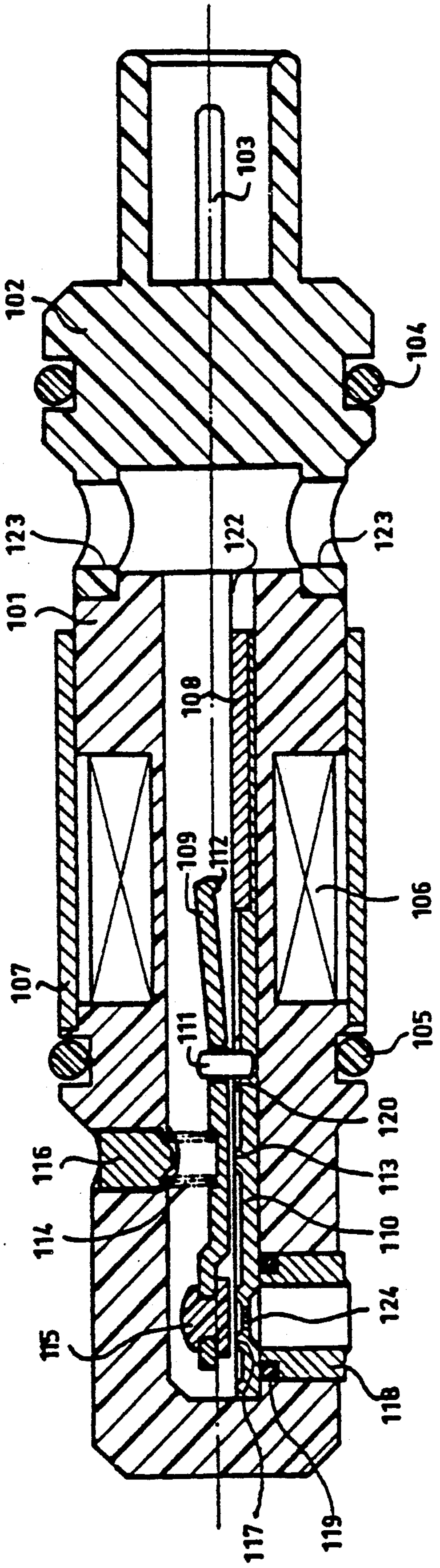
FIG. 1 is a longitudinal cross sectional view through a first embodiment of fuel injector according to the invention.

A preferred design of this injector is shown in FIG. 1, details of which will be explained in the following:

The magnetic circuit of the injector according to FIG. 1 consists of tilt-armature 109, magnet pole 108 and return flow pipe 107. The magnetic circuit elements are made of ferromagnetic material. Suitable is preferably ; stainless steel containing approximately 12% chromium; its characteristics are: high specific electrical resistance and a relatively high saturation flux density. The flat magnet pole 108 is fastened to valve carrier 110 either by laser welding or riveting. Valve carrier 110 consists of non-magnetizable material. A suitable material of construction for valve carrier 1!0 is, for instance, austenitic specialty steel with the highest possible specific resistance. The working pole surface preferably is about 2–4 $mm^2$ and is thus considerably smaller than for conventional injectors. By working pole surface, understand the surface of magnet pole 108 which is covered by armature 109. The working pole of the magnetic circuit is about in the center of magnetic coil 106. With such a centrally located working pole, a sufficiently high electromagnetic efficiency can be achieved despite the very small working pole surface. For a not centrally located working pole, the straying of the electromagnetic field lines would result in a strong reduction in electromagnetic efficiency. The width of armature 109 and pole 108 is preferably about 3–4 mm, the thickness of these elements, in general, is significantly less than 1 mm (preferably 0.6–0.8 mm).

Valve carrier 110 is mounted in groove 122 of valve housing 101. The backside of valve housing 101 is connected to the upper segment 102 of the housing. Valve housing 101 and upper housing section 102 are made of plastic and are magnetically and electrically nonconducting. Connection of the housing segments is preferably by means of ultrasound welding.

Magnet coil 106 is directly would onto valve housing 101. Magnet coil 106 has approximately 400–1000 turns, depending on the trigger circuitry and the desired working speed of the injector. Magnet coil 106 is connected to contact pins 103. Tilt-armature 109 is angled at the bearing location 120. At the fulcrum of armature 109, guide pin 111 is pressure fitted into valve carrier 110. Valve seat 1!7 is located at the front end of the valve carrier. The valve seat diameter is preferably about 1–2 mm. The valve seat is closed by valve obturator 115 for the unenergized state of the magnetic circuit. The obturator preferably consists of elastic plastic material, e.g. PTFE (trade named Teflon).

Armature 109 is forced against valve carrier 110 by reset spring 114. Below armature 109, at the location of the reset spring, a limit stop 113 is provided on which the armature rests in the unenergized state. Limit stop 113 prevents unacceptable bending of the armature by the force of the spring, while in the rest position. Such bending would lead to leakage of the injector in the region of valve seat 117. Valve carrier 110 has stamped recesses, so that armature 109 only contacts valve carrier 110 at armature bearing 120, valve seat 117 and limit stop 113, while the magnetic circuit is not activated. The stamped recess areas are an absolute requirement to prevent hydraulic sticking. The depth of these recessed areas does not have to be more than 0.01–0.02 mm. With such small recesses, a desired damping of the armature reset movement can be achieved. The bearing for reset spring 114 is adjustment pin 116. Initial spring tension is set by moving adjustment pin 116. In this manner, the dynamic calibration of the injector is achieved by state of the art measures. Below valve seat 117, diffuser 118 is installed, it carries gasket ring 119. Fuel supply is via opening 123 in the upper section of valve housing 102 The injector is sealed in the not represented mounting opening by means of gasket rings 104 and 105.

Production of the injector is extremely cost efficient. Valve carrier, armature, and the magnet pole are preferably die cut from flat sheeting. The upper side of valve carrier 110 and magnet pole 108 are ground in one processing step so that bearing location 120 of the armature and the upper side of magnet pole 108 are in the same plane. The valve seat and the recesses to reduce hydraulic sticking are preferably shaped in one stop by means of stamping. Surface quality can subsequently be improved by polishing. Depending on the precision of the stamping step, the grinding step may not be necessary, and finishing may only require the less costly polishing procedure. The bottom side of armature 109 is also prepared jointly with obturator 109, preferably by grinding, so that a common plane results in the bearing locations for the case of the unenergized armature. At the working pole location, either armature 109, or magnet pole 108, are also provided with a recess segment in order to reduce interfering hydraulic forces at this location. The depth of this recessed segment should preferably be about 0.01–0.02 mm. All stop surfaces should have an area of respectively about 0.5–1 $mm^2$. For such small stop surfaces pocketing is avoided, even for non-hardened surfaces, due to the extremely small armature mass.

Further simplifications in manufacture can be achieved, in distinction from the presentation in FIG. 1, by keeping the bottom side of armature 109 flat over its total length, and recessing magnet pole 108 by the height of the armature stroke with respect to the bearing plane. This automatically results in the desired alignment between pole 108 and armature !09 for the case of the energized valve. Armature stroke can then be set very simply by joint grinding of valve carrier 1!0 and pole 108; the finished plane of the pole is then recessed by the height of the armature stroke with reference to the plane of the valve carrier. The design shown in FIG. 1, featuring an angled tilt-armature, has mainly been chosen for the sake of a clearer representation of the working principles of the injector.

Arranging valve seat and armature bearing in the same plane guarantees the required leak proof seating of the valve. The necessary seal can only be achieved when the obturator and valve seat close to less than 0.1 micrometer. Consequently, the slightest amount of tilting or canting of these parts with respect to each other will result in unacceptable leakage. In addition, the sealing capacity of the valve seat is further improved by fashioning valve obturator 115 out of plastic material. In this context, it should be mentioned that the use of obturators made out of plastic is generally obvious, and has been previously proposed. Such attempts have, however, so far not been successful for state of the art injectors. The reason for this is to be found in the fact that state of the art injectors are characterized by a relatively large armature mass which, additionally, is concentrated in the central axis of the injector. These relatively large armature masses result in high impact loads in the obturator region. To reduce the impact load on the obturator to tolerable values requires great elasticity on the part of the obturator. Such elasticity can only be obtained for rather thick obturators. With such thick obturators unacceptable changes in armature stroke occur due to creeping of the plastic material; in practice, injectors of this type have a relatively short life time. For the case of thin plastic obturators in state of the art injectors, they usually break after short working life periods because of the excessive mechanical stress.

For injectors according to the instant invention, the use of plastic obturators is made possible by the extremely low armature mass, and the overall lower power level compared to state of the art injectors. Furthermore, only a fraction of the total armature mass participates in the total stroke, due to the lever type arrangement. The already low kinetic energy of the armature is further considerably reduced by limit stop 113 at the reset spring location. At the moment of connection between obturator 115 and valve seat 117, only a fraction of the total kinetic energy of the armature is effective.

Due to the constructive measures elaborated above, only extremely small loads occur at the valve seat location. Therefore, as an alternative, it is both possible and suitable to completely omit obturator 115. Armature 109 is then made flat in the valve seat region, making direct metallic contact with the valve seat. Hardening of these segments is in general not necessary. To improve the sealing characteristics it may be suitable to fashion a very thin armature 109 in the valve seat region, so that a certain minimum elasticity is obtained. To this effect, the armature thickness in the valve seat region should be reduced to about 0.1 mm. The width of the contact area of the seat should then be about 0.1–0.15 mm.

Static flow calibrations for the injector should suitably be done for the unmounted valve. For this, nozzles are attached to the unfinished valve carrier 110 and the flow capacity of the openings is determined. Then, the armature stroke needed for a predetermined flow is determined. Subsequently, the valve carrier is matched with an armature of suitable stroke, or the pole surface is undercut by grinding to the depth of the previously determined stroke height. Alternatively, it may be economical, based on the low production costs, to only use valve carriers with narrow flow through tolerances for further manufacture and to omit the matching with armatures of different stroke heights. It may further be economical to choose such a large stroke height, that, for the energized armature, only a small amount of damping is effective in the valve seat region, which allows for large tolerances in armature stroke. Such larger tolerance ranges are feasible because of the extra fast floating times of the injector, even for relatively large armature strokes.

In the following the characteristic dynamics of the injector according to this invention will be detailed, they differ considerably from that of state of the art injectors. To start, the injector according to this invention has a considerably smaller working pole area, and a larger stroke in the valve seat region. Considered in isolation, these two characteristics make for a larger magnetic stray field, and thus would lead to decreased electromagnetic efficiency. This decrease in static electromagnetic efficiency is, however, more than compensated for by the other valve characteristics. To begin with, the stray magnetic field is reduced to tolerable values by the central location of the working pole. In addition, the effective length of the working gap can be made smaller than the valve stroke, due to the mechanical advantage gained from the lever design of the armature. The thin-walled magnetic circuit makes it possible to largely avoid eddy-current losses. The small working pole surface leads to a lower inductivity of the magnetic circuit, even so the number of turns on the coil is considerably larger than for state of the art injectors. Due to the small inductivity, the build-up of the magnetic field is very fast. Furthermore, because of the relatively large number of turns, and because of the relatively large stray filed, a complete return flow path with magnetically conducting material is not required. Additional return flux elements between return flow sleeve 107 and working pole 108 and armature 109 are therefore generally not required. This again results in especially simple and cost efficient manufacturing steps. The lever design of the armature, and the resulting greater armature stroke, make it possible to use especially small seat diameters. For reduced seat diameters there follows always a reduction in the work necessary to open the gap.

The most favorable lever transmission depends primarily on the desired fuel flow and fuel pressure. Lever transmission, in this context, is defined as the ratio of armature lengths between bearing location and valve seat to that between bearing and working pole. Armature stroke is defined as stroke height in the working pole location, valve stroke refers to the stroke at the valve seat location. As a rule, armature stroke should not exceed 0.1 mm. For larger armature strokes the stray field increases considerably, combined with a decrease in electromagnetic efficiency. Armature length between bearing and working pole should be in the range of 5–10 mm. For injection into the suction pipes of motors, a leverage ratio of about 1–1.5 should be used as represented in FIG. 1. For central injection, where all of the fuel is injected at relatively low pressure by a single injector before the throttle valve of the motor, a lever transmission of about 2 is appropriate. This allows for large flow amounts at low armature stroke and small valve seat diameters. The most favorable transmission ratio can also be practically determined by optimization.

The injector according to the present invention has only a low tendency for armature bounce. This is initially surprising to the expert, since, based on the relatively large free lengths of the armature lever, and the relatively large valve stroke, one would expect exactly the opposite. By means of the armature design according to the invention the effect is, however, to achieve an effective suppression of bounce movements. This is caused by the fact that the armature, towards the end of the floating movement, is very quickly released because of its inertia in the region of bearing location 120. During this process, a vacuum is produced there, followed by a damping flow, which considerably reduces the kinetic energy of the armature. In order to effectively use this attenuation process it is necessary, however, to provide a relatively large seating area for the armature at the bearing region. Bearing surface 120 should therefore be about 10 $mm^2$. No significant damping of the opening and closing movement itself needs to be feared, even for a seating surface of this size, due to the lever action of the forces involved. In addition, armature bounce remains within tolerable limits because of the overall lower force level, and the small effective armature mass. Locating reset spring 114 close to the armature bearing results in a further reduction of armature bounce.

Injector design in line with the present invention is not confined to the specific example of FIG. 1. Suitable variations can, for instance, be arrived at by sliding the valve carrier frontally into the valve housing, and closing the valve housing at the front near the diffuser. The metallic return flow sleeve, which surrounds the housing, can be extended to the very front edge of the injector in order to improve on the mechanical stability of the injector. In addition, it is possible to feed the fuel in the central axis of the injector and to mount the electrical contact plug at the side. Fuel can be guided by means of a slanted opening, or an angular passage, from the valve seat to the discharge nozzle, which allows for arranging any desired direction of injection. By such measures, good compatibility with already existing series production types of injectors can be achieved. Furthermore, it is possible to solidly join the diffuser with the valve carrier, where the mechanical fastening of valve carrier and valve housing is only via the diffuser. This results in a float mounted valve carrier which is then insulated from external interfering forces. In addition, resetting of the armature by means of a coil spring can also be effected with either a leaf spring or a torsion spring, where the latter are directly joined to the valve carrier through riveting. Valve carrier or housing can wholly or partially consist of non-magnetizable sinter metal, allowing for the production of even complex shapes by cost effective procedures. For exceptionally high demands on shelf life and wear resistance of the injector, individual parts of the device can be hardened or be provided with wear resistant coatings. Additionally, both armature and magnet pole can be provided with a thin, non-magnetizable coating, which forms a permanent air gap. This further reduces the opening time of the magnetic valve. For such coatings, non-metallic anti-wear coatings produced by ion implantation are, for example, well suited. The process of ion implantation has recently been further developed, so that this method in the meantime can also be used for the economical production of small mass produced parts. The bending stiffness of the armature can be improved by stamping it with longitudinal ribs. It is also possible to reinforce the armature in a sidewise direction, resulting in a U-profile. In addition, the injector is always provided with a fuel filter, which for practical purposes has been omitted in the drawing. Specific emphasis is directed to the fact that the drawings shown are not engineering drawings, but rather are made for the purpose of elaborating for the expert the functional aspects of the injector according to the invention.

Figure 2:
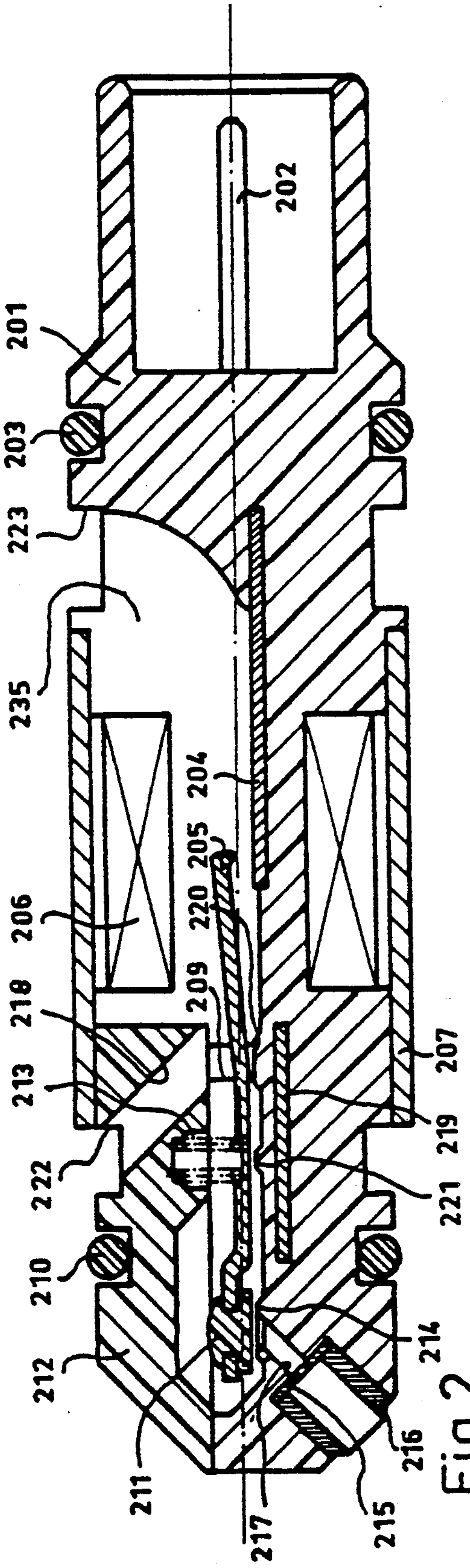
FIG. 2 is a longitudinal cross sectional view through a second embodiment.
Figure 3:
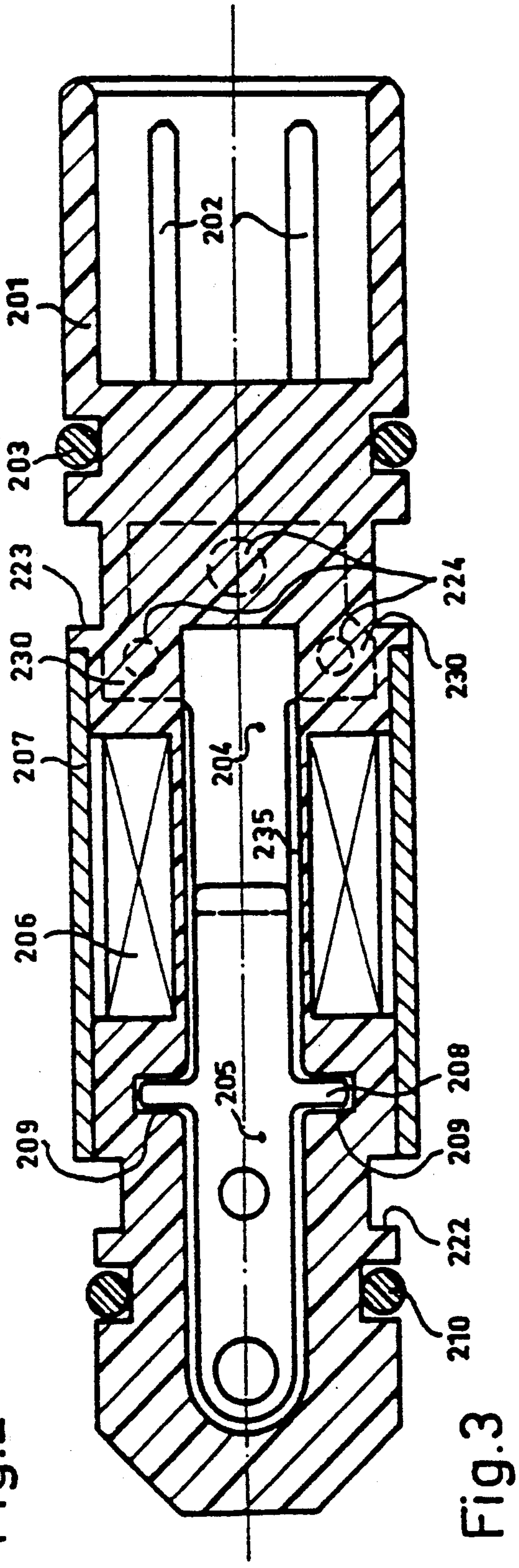
FIG. 3 is a view at 90° to the view of FIG. 2.

In the following additional possible design examples of the injector according to this invention will be presented:

FIGS. 2 and 3 show an injector with the armature directly resting on the housing. The injector is represented in two sectional views which are at right angles to each other. Identical parts are marked with the same reference numbers.

The injector according to FIGS. 2 and 3 is equipped with a tilt-armature 205 which has two sideways extending bearing lugs. The bearing for armature 205 is provided by two grooves 209 in valve housing 201, allowing for some lateral play. Armature 205 is forced against valve seat 214, limit stop 221 and bearing 220 by means of reset spring 213. The armature is provided with a plastic valve obturator 211. Reset spring 213 is anchored in upper housing section 212. Upper housing section 212 is solidly joined to valve housing 201 by, for instance, ultrasound welding, or by means of adhesive bonding. The valve is completely perfused by fuel. Fuel passes via a circumferential groove 222 through opening 218 into the valve housing. From there it passes via axial groove 235 to circumferential groove 223 and from there to fuel recycle. The fuel to be injected reaches injector plate 215 via valve seat 214 and channel 217. Injector plate 215 is secured to the valve housing by diffuser 216. Diffuser 216 is pressure fitted directly into the valve housing. The valve housing is sealed against the surroundings of the injector by means of gasket rings 203 and 210. Different from the injector according to FIG. 1, the instant valve injects the fuel at an angle, a suitable situation frequently appropriate based on given mounting conditions. Alternatively, the injection direction can also be arranged to be parallel to the central axis of the injector to provide broad based compatibility with conventional state of the art injectors. Fuel flow from the valve seat to the diffuser nozzle would then be arranged via an angle-passage.

The magnetic circuit of the injector is formed by armature 205, magnetic pole 204, and an additional flow guide 2!9. Magnet pole 204 and flow guide 219 are embedded in the plastic of valve housing 201. Pole 204 is perforated to establish close mechanical contact with the plastic material of valve housing 201. By directly incorporating these parts into valve housing 201, the mechanical stability of the valve housing is considerably increased. Magnet pole 204 has side brackets 230, which guarantee close magnetic coupling of pole 204 with return flow sleeve 207. Flow guide 219 should also feature such brackets and perforations; these are not shown in the drawing for the sake of clarity. Magnetic coil 206 is electrically connected to contact pins 202 and has been wound directly onto valve housing 201.

With respect to materials of construction, dimensions and tolerances, as well the dynamic characteristics of the valve, the same explications apply as for the injector according to FIG. 1. These principles are also applicable for all other examples to be shown.

The flat shape of the armature of injectors according to the instant invention makes it very simple to use polarized magnetic circuits. Such magnetic circuits are in principle well known from relais technology. Through the use of polarized magnetic circuits it is possible to substantially improve the degree of electromagnetic efficiency. Polarized magnetic circuits always incorporate a permanent magnet, the magnetic field of which is superimposed on the field of the magnetic coil. For a symmetric arrangement of such a magnetic circuit, a bi-stable switching mode results, where the armature remains in the respective rest position for the unenergized state of the magnetic coil. Switching action from the rest position occurs through short electrical impulses of changing polarity. These bi-stable magnetic circuits are, however, poorly suited for electromagnetic injectors because of safety concerns. In general, it is a requirement for electromagnetic injectors that the valve return automatically to the closed position in case of service interruptions from the trigger circuitry or on loss of supply voltage. By arranging the magnetic circuit in unsymmetrical fashion, it is possible to obtain mono-stable switching modes also for polarized magnetic circuits, where the armature, on loss of the coil voltage, always resets to the single function rest position. With such mono-stable polarized magnetic circuits the drop-off speed of the armature can be additionally accelerated through a counter impulse. In the following, suitable mono-stable magnetic circuits for injectors according to this invention will be further detailed. The valve housing, which is of course always necessary, is not represented for the sake of clarity.

Figure 4:
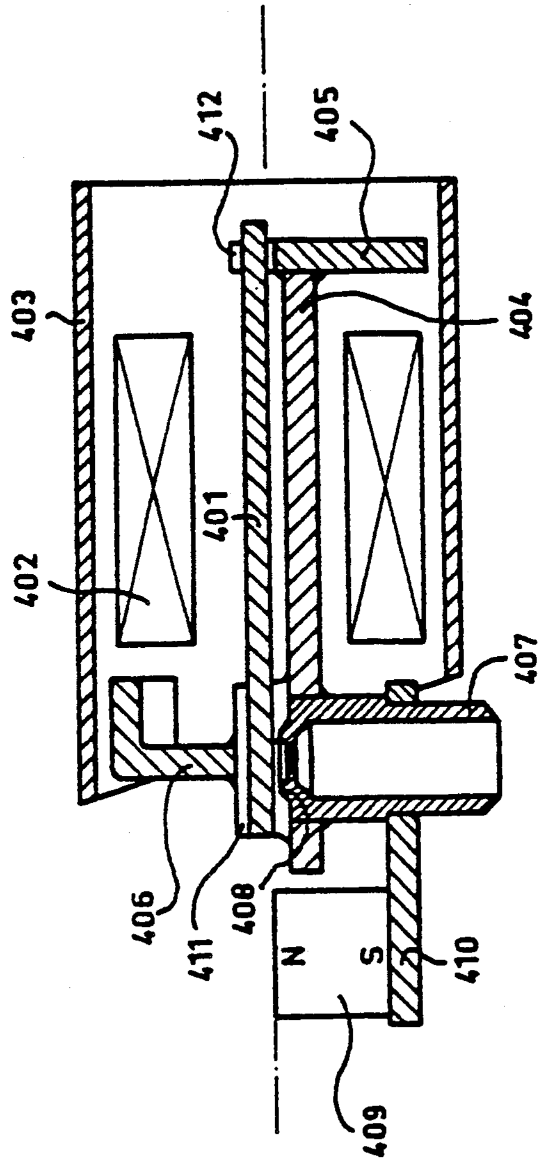
FIG. 4 is a fragmentary cross sectional view of a third embodiment.

FIG. 4 describes a mono-stable polarized magnetic circuit for an injector according to the instant invention. The basic design of the magnetic circuit is familiar from relais technology. Armature 401 is reset by the magnetic field of permanent magnet 409, making an additional reset spring unnecessary. The open circuit rest position of the magnetic system is in fact diffuser 407. Diffuser 407 is solidly joined to valve carrier 404, which consists of non-magnetizable material. At the end of valve carrier 404, reset-pole 405 is mounted, which also serves as the bearing location for the armature. The contact surfaces for the armature on reset-pole 405 and valve seat 408 are in the same plane. Both contact surfaces are machined together by grinding, to prevent possible angular deviations. Armature 401 is guided by side brackets 412 of reset-pole 405, where the side brackets fit into side grooves of armature 40!. Between armature 401 and reset-pole 405 a permanent magnetic field exists, through its action the armature is pulled to the reset-pole. Thus, generally no additional measures are required to prevent the armature from slipping out of its bearing. For safety reasons, an additional spring can be provided, which forces armature 401 onto reset-pole 405. The front end of valve carrier 401 features on both sides the bent up brackets 411, at about the valve seat region; these provide the base for working-pole 406. The stroke of armature 401, and with this the valve stroke, is defined by the differential distance between valve seat 408 and working-pole 406 and the thickness of armature 401. Magnetic return flow between the individual magnet poles of the system is by means of the return flow pipe 403 which envelops the magnetic circuit. The armature is surrounded by trip coil 402. Permanent magnet 409 is mounted on fixture 410, which in turn is connected to the rest-position-pole 407. The permanent magnet preferably consists of AINiCo-material, the magnetic characteristics of which remain largely constant over a wide temperature range. The direction of magnetization is indicated by letters N-S. North- and South-pole can of course also be reversed, which requires, however that the flow direction of electric current through trip coil 402 also be reversed by changing the contact leads. All flux bearing components of the magnetic circuit consist of magnetically soft material. Metallic connections are generally made by laser welding. The permanent magnet should be mounted through adhesive bonding. Alternatively, diffuser 407 (rest-position-pole) can also be provided with an angular opening to direct the injection stream of the fuel in the direction of the central valve axis. Permanent magnet 409 is then side mounted on the diffuser.

The current direction for the energized state is chosen in such a want that the electromagnetic field, on the one hand, is opposite to the permanent magnetic field between rest-position-pole 407 and armature 401, and, on the other hand, tends to strengthen the considerably weaker permanent field between working pole 406 and armature 401. Armature movement starts as soon as the magnetic force between working pole 406 and armature 401 exceeds the hydraulic counterforce of the valve and the opposite magnetic force between rest-position-pole 407 and armature 401. The desired mono-stable behavior is obtained by virtue of the differences in pole surfaces of working pole 406 and rest-position-pole 407 on the one hand, and by the unsymmetrical placement of permanent magnet 409, on the other hand. The surface of rest-position-pole 407 suitably is chosen to be 2–4 times as large as the surface of working pole 406, thus strengthening the magnetic flux through the rest-position-pole. Permanent magnet 409 is solidly coupled to 407 via magnet mounting 410. This relatively strong coupling of the permanent magnet with rest-position-pole 407 causes a strong magnetic field between armature 401 and rest-position-pole 407, even while the circuit is open; if armature 401 is in fact in contact with the working pole, this field guarantees resetting of armature 401 to the rest position. In addition, armature 401, or working pole 406, must be coated with a non-magnetizable coating to prevent magnetic sticking of 401 to 406 under the effects of the permanent magnetic field. Magnetic return flow for permanent magnet 409 is provided via the stray field of the permanent magnet and via return flow pipe 403. Return flow pipe 403 extends forward on the upper side to facilitate entry of the stray magnetic field of the permanent magnet into 403. Working pole 406 is angled at the upper end in order to enlarge the surface opposite 403, this again results in relatively tight coupling of the electromagnetic field to working pole 406.

Figure 5:
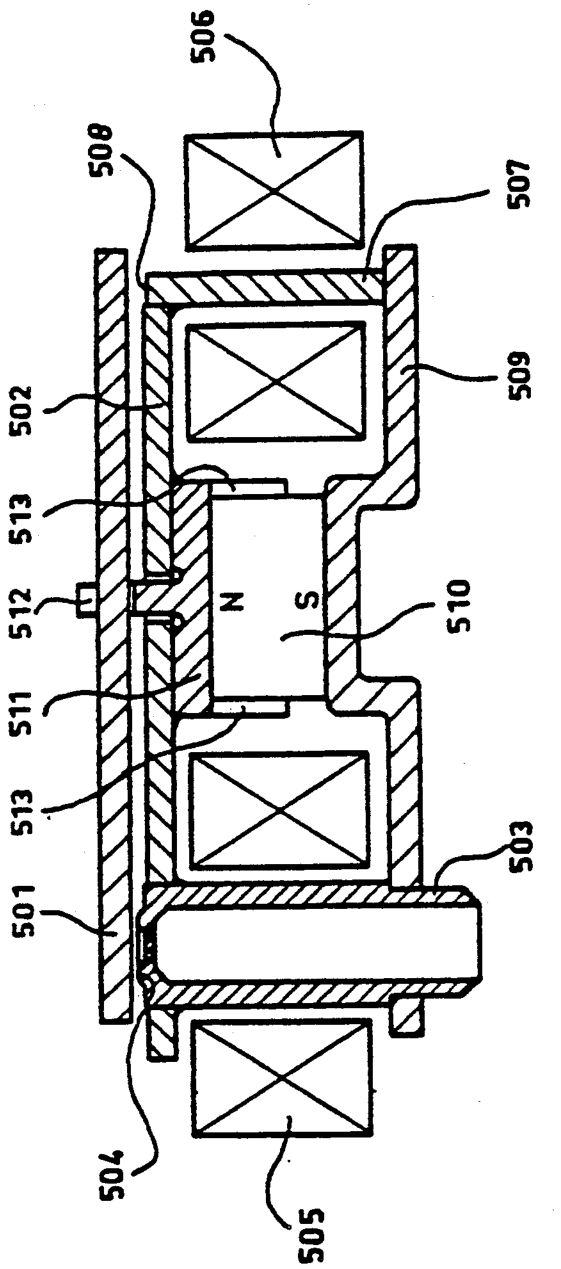
FIG. 5 is a fragmentary cross sectional view of a fourth embodiment.

A further suitable polarized magnet system with mono-stable switching characteristics is shown in FIG. 5. In the case also, the basic design of the magnetic circuit is already familiar.

Armature 501 is reset by the field of permanent magnet 510, this no additional reset spring is required. The rest-position-pole of the magnet system is formed by diffuser 503. Diffuser 503 is connected to valve carrier 502 which consists of non-magnetizable material. Working pole 507 is mounted at the back end of 502. The bearing location for armature 501 is provided by mid-location pole 511 to which permanent magnet 510 is attached. The contact surfaces for the armature on mid-location pole 51 and valve seat 504 are in the same plane. These surfaces are produced by a joint grinding step to prevent any possible angular deviations. Mid-location pole 511 features two side brackets which fit into the side grooves in armature 501. These brackets provide lateral guidance for armature 501. A magnetic field is in continuous existence between mid-location pole 511 and armature 50!; the effect of this field is that the armature is pulled to the bearing surface. Therefore, generally no additional measures are needed to prevent the armature from slipping out of the bearing.

Working pole 507 is attached to the back edge of valve carrier 502. Surface 508 of working pole 507 is undercut by approximately 0.1 mm with reference to the backedge of valve carrier 502 in order to establish a permanent air gap which prevents magnetic sticking for the case of the open valve. Alternatively, surface 508 of the working pole can also be arranged to be in the same plane with valve carrier 502, and the permanent air gap, always required at this location, can be produced by a non-magnetizable coating. The stroke of 501 is defined by the differential distance between valve seat 504 and mid-location pole 511 on the one hand, and the backedge of valve carrier 502 on the other hand. Magnetic return flow between the individual poles of the magnetic system is by means of return flow sleeve 509. The magnetic circuit has two magnet coils 505 and 506, one is located on reset-pole 503, the other on working pole 507. Permanent magnet 510 is attached to the mid-location pole 511. Mid-location pole 511 possesses a side bracket 513 which is bent downwards; it produces a magnetic side flow of the permanent magnetic field and serves to magnetically stabilize the permanent magnet. The permanent magnet consists preferably of AlNiCo-material. The direction of the magnetic field is indicated by the letters N and S. It is of course possible to exchange North and South poles of the permanent magnet, which necessitates also that the direction of the electric current through the magnetic coils be reversed. All magnetic flux bearing parts of the magnetic circuit consist of magnetically soft material. The connections between the individual poles and valve carrier 502 are usually made by laser welding. The permanent magnet should be attached by adhesive bonding. The diffuser (rest-position pole) may, alternatively, also be of right angle design and contain an angled passage, so that the direction of fuel injection is toward the central axis of the valve. Coil 505 is then placed on the diffuser in the central axis of the valve. The coils may also be parallel or in series. Generally, parallel circuits are preferred in order to obtain a magnetic circuit with low impedancy, which is advantageous for fast action of the valve. The direction of electrical current for the coils is chosen so that the electromagnetic field of coil 505 opposes the permanent magnetic field, and the field generated by coil 506 is in the same direction as the permanent magnetic field. Thus, the permanent magnetic field between working pole 507 and armature 501 is reinforced, and that between reset-pole 503 and armature 501 is weakened. The desired mono-stable behavior is obtained first by the different pole surfaces of working pole 507 and reset-pole 503, and, second, because of the permanent air gap between working pole 507 and armature 501. The surface of reset-pole 503, as in the previous example in FIG. 4, is chosen to be 2–4 times the size of the surface of working pole 507. Magnetic flow back of permanent magnet 510 and coils 505 and 506 is via return flow guide 509.

Figure 6:
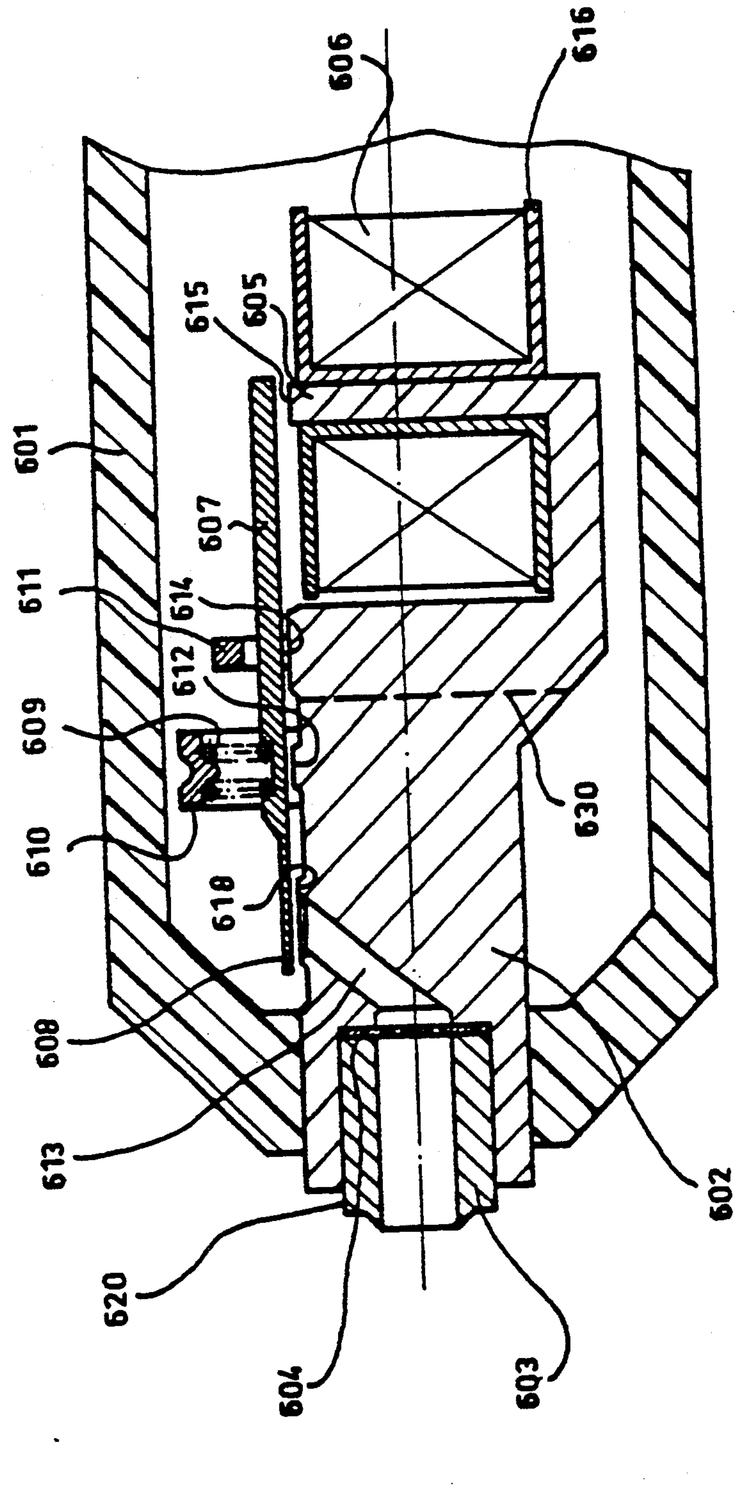
FIG. 6 is a fragmentary view of a fifth embodiment.

The exact engineering design of the individual magnetic resistances for the polarized magnetic circuit systems, especially that described in FIG. 4, requires extensive formulas which are not shown here. For the design of polarized electromagnetic systems there exists voluminous specialty literature, which we hereby make reference to (e.g. Schueler, Brinkmann: Dauermagnete, Berlin, Heidelberg, N.Y. 1970). It may often be suitable to carry out the exact fine tuning experimentally. As regards the dimensions of the armature, the working pole surface, and the valve dimensions of the polarized magnetic systems, the explanations for the simple magnetic circuits according to FIG. 1–FIG. 3 are analogously applicable. Another suitable execution of the valve according to the instant invention is shown in FIG. 6. Valve carrier 602 is float mounted to keep external interfering forces from the sensitive internally mounted parts of the injector. The forward section 620 of the valve carrier is of circular design and is pressure fitted into housing 601. Housing 601 is preferably made of plastic material. On the flat upper surface of valve carrier 602, the following are arranged in the same plane: bearing surface 614, limit stop 612, and valve seat 618. This plane is slightly higher than forward section 620 of valve carrier 602, so that the planar finishing of this surface can be done without interference from protruding segments. Forward section 620 of valve carrier 602 features a central opening into which diffuser 603 is pressure fitted. Diffuser 603 carries injector plate 604. Valve seat 618 is connected to injector plate 604 by angled opening 613. Valve seat 618 should be of oval shape in order to achieve best possible flow parameters in the valve seat area, despite the angled connection passage. The simple magnetic circuit of the injector consists of valve carrier 602 and armature 607. Both valve carrier 602 and armature 607 are of magnetically soft material. Valve carrier 602 is preferably made of sintered metal as a preform. Pole 605 carries magnet coil 606, which is wound onto coil frame 616. Magnet coil 606, as well as the contact pins, which are not drawn, should be surrounded by injection molded plastic material. This reliably prevents leakage of fuel along connection wires or contact pins. For state of the art injectors, this usually requires more elaborate sealing measures. Working pole face 615 of pole 605 is undercut by the height of the stroke, with respect to the bearing surface. The bottom side of armature 607 is completely flat over its total length. Armature 607 is thinned down at its front extension, resulting in the flexible lamellar segment 608. This thin extension improves the sealing capacity of the injector. Armature 607, or the upper side of valve carrier 602, should be provided with a non-magnetizable coating to establish a permanent air gap. Bearing for armature 607 is provided by U-shaped bracket 611, which fits into two lateral grooves of armature 607. The lateral grooves ar not visible in the drawing, being outside the sectional plane. Bracket 611 is locked to valve carrier 602 by two lateral grooves. Armature reset is by means of reset spring 609. The reset spring is mounted on U-shaped counter flange 610. Counter flange 610 encircles armature 607, and is connected on both sides to valve carrier 602. In place of pressure spring 609, a tension spring could be arranged in a hole drilled in valve carrier 602, below the armature. The alternative choice of a tension spring allows for a further reduction in valve dimensions.

The valve described in FIG. 6 is of especially simple construction, requiring only minimal manufacturing costs. With respect to the dimensions, the same statements made previously apply. The disadvantage in this case, versus the previous models, is a poorer degree of electromagnetic efficiency. This reduction in electromagnetic efficiency is due to a larger magnetic stray field, caused by the arrangement of the working pole outside the coil. In addition, the efficiency is further impaired by magnetic pull in the forward region of the armature; these forces are opposite to the magnetic force in the region of working pole 605. These forces can be eliminated by producing valve carrier 602 in two segments, with the forward section consisting of non-magnetizable material. The non-magnetic forward section of the valve carrier should then preferably be joined to the magnetic circuit by means of laser welding. The separation plane between the non-magnetic forward section of the valve carrier and the magnetic circuit is shown as a broken line 630 in the drawing. Because of lower production costs, a single unit execution of the valve carrier is often preferred. In addition, it should be noted that the magnetic coil can also be differently arranged than shown in FIG. 6. Alternatively, the magnetic coil can encircle armature 607 between bearing 614 and pole 605, or, could also encompass the lower part of valve carrier 602.

If the armature is surrounded, a slightly improved electromagnetic efficiency can be obtained, since a larger part of the stray field magnetic lines passes through the armature and contributes to the generation of the magnetic field. For the case that the magnetic coil encloses the lower part of valve carrier 602, a decrease in electromagnetic efficiency results. The design shown in FIG. 6., where the magnetic coil surrounds working pole 605, represents the best solution from a manufacturing point of view.

In conclusion, we wish to note that the valves according to the present invention are well suited for the construction of fast two-way or three-way valves with low flow rates. The construction of two-way valves is done by providing the valve seats with suitable connectors. The construction of three-way valves, in line with the designs shown in FIGS. 1–4, is arrived at by arranging the valve seats on the same axis opposite each other on both sides of the armature. The armature is then suitable designed as a thin lamella in the valve seat region, as shown in FIG. 6. The flexibility of the armature provides for the required sealing characteristics. The design shown in FIG. 5 can be transformed into a three-way valve by arranging respectively one valve seat on each side of the armature bearing inside the respective magnet coil. The contact surfaces of the two seats and the mid-location pole with the armature should be in the same plane. The valve is provided with a tilt-armature, similar to the description in FIGS. 1–3; the stroke heights is determined by the degree of the armature angle. The generally desired mono-stable function characteristics are arrived at by providing a non-magnetizable coating at one of the two valve seats, the resulting permanent air gap should correspond in depth about to the armature stroke. Without such a permanent air gap a bi-stable switching mode results.

Other suitable designs and variants of the valves according to the instant invention can be deduced from the claims.

I claim:

1. An electromagnetic operated fuel injector comprising an injector body having a fuel inlet, a fuel outlet, a valve armature for opening and closing a fuel path through said injector body between said fuel inlet and said fuel outlet, actuating means comprising a solenoid controlling the operation of said valve armature for opening and closing said fuel path, pivot means pivotally mounting said valve armature between opposite ends thereof on said injector body such that said actuating means is effective to reciprocally pivot said valve armature about said pivot means, one of said opposite ends of said valve armature comprising obturator means that, as said valve armature is reciprocally pivoted by said actuating means, selectively seats on and unseats from a seat means that is disposed on said injector body to thereby open and close said fuel path, and another of said opposite ends being disposed for coaction with said solenoid, characterized in that said solenoid bounds an interior space said another of said opposite ends of said armature is disposed in said interior space with said armature passing through one axial end of said interior space, in that a pole piece enters said interior space via another axial end of said solenoid to dispose a pole face of said pole piece in said interior space in mutual juxtaposition to said another of said opposite ends of said valve armature, and in that said valve armature and said pole piece form a magnetic circuit for flux issued by said solenoid, said magnetic circuit including a working gap which is cooperatively defined by and between said pole face and said another of said opposite ends of said valve armature and which provides for said actuating means to reciprocally pivot said valve armature about said pivot means.

2. An electromagnetic operated fuel injector as set forth in claim 1 characterized further in that said injector body comprises a non-magnetic carrier on which both said pivot means and said pole piece are mounted.

3. An electromagnetic operated fuel injector as set forth in claim 2 characterized further in that said injector body comprises a non-metallic housing which includes a longitudinally extending segment of said fuel path, and said carrier said disposed against a wall portion of said longitudinally extending segment of said fuel path.

4. An electromagnetic operated fuel injector as set forth in claim 3 characterized further in that said seat means is disposed on said carrier.

5. An electromagnetic operated fuel injector as set forth in claim 4 characterized further in that a bias spring means is disposed between said housing and said valve armature and acts on that portion of said valve armature that is between said obturator means and said pivot means to resiliently urge said valve armature to seat said obturator means on said seat means.

6. An electromagnetic operated fuel injector as set forth in claim 1 characterized further in that said armature comprises a plate, said plate defining an obtuse angle.

7. An electromagnetic operated fuel injector as set forth in claim 6 characterized further in that said another of said opposite ends of said valve armature is disposed substantially half way along the axial length of said interior space.

* * * * *